May 26, 1931.     C. KOCOUR     1,806,806
APPARATUS AND PROCESS OF DETERMINING THE STRENGTH OF SOLUTIONS
Filed May 1, 1926
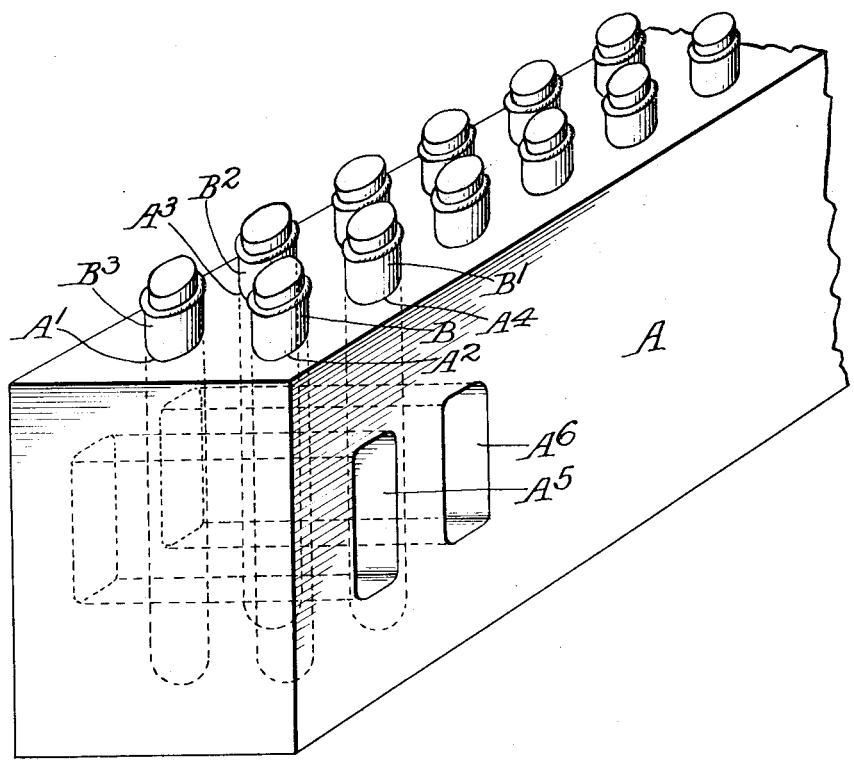
Inventor
Cyril Kocour
by Parker + Carter
    Attorneys.

Patented May 26, 1931

1,806,806

UNITED STATES PATENT OFFICE

CYRIL KOCOUR, OF CHICAGO, ILLINOIS

APPARATUS AND PROCESS OF DETERMINING THE STRENGTH OF SOLUTIONS

Application filed May 1, 1926. Serial No. 106,149.

My invention relates to improvements in apparatus and process for determining the strength of solutions. My invention relates particularly to an apparatus and process for determining the strength of nickel, copper, chromium and other solutions such as are used by electroplaters and others, the strength of which solutions bears a direct relation to the color value, by a visual or color analysis without the use of reagents or any chemical analysis, and it will be understood that such an apparatus and process may be used in connection with determining the strength of any solution wherein there is a direct relation between the strength of the solution and the intensity of its color.

Nickel solutions as used by electroplaters range in intensity from one to eight ounces per gallon of metallic nickel and it is desirable to be able to control and determine the strength of solution within limits of not less than one quarter of an ounce per gallon. The nickel solution is green in color and I propose to determine the strength of the solution by associating it with a solution forming a color screen of complementary color, in this case red, of such strength that the red and the green to some extent neutralize each other, and comparing it with a similarly neutralized known solution or color screen.

In a preferred form of my process I provide the following apparatus: (1) A vial of red solution of such tone and intensity as almost completely to neutralize a similar vial of nickel solution of approximately three ounces per gallon of metallic nickel, this tube is called the neutralizer. (2) A vial of red solution of exactly one half the intensity of color of the neutralizer. This vial is called the zero or zero vial. (3) A series of nine vials of the same size and character as the zero and neutralizer, but containing nickel solution of the following intensities in ounces per gallon: one quarter, one half, three quarters, one, two, three, four, five, six. These vials also each contain the same amount of red as the zero vial, that is one half as much as the neutralizer, and all of these vials are permanently closed and always contain exactly the same amount of the red and the green in some permanent and unchanging form. (4) A vial similar to the others but open and in which the unknown liquid may be placed for comparison.

For purposes of convenience and reference the zero, one quarter, one half and three quarters vials are referred to as fractional vials. The one, two, three, four, five, six vials are referred to as whole number vials. In using these vials I preferably provide a block having a series of vertical holes to contain all the vials in use. At some place in this block I provide four associated holes arranged in the form of a square, the block is pierced transversely with two horizontal holes, each one passing through two of the vial containing holes, so that transmitted light may be seen as it passes through the two vials of each pair in parallel.

In making comparison I place a vial containing the unknown in line with the neutralizer so that the light rays reaching the eye of the observer pass through the unknown and the neutralizer vial and are, therefore, to some extent neutralized. I also place the zero vial at one side of the pair containing the unknown and the neutralizer, and then try one after another of the whole numbered vials until I find some one of the whole numbered known vials which in line with the zero vial give substantially the same neutralized color as the neutralized color given by the combination of the neutralizer and the unknown. By then referring to the label on the whole numbered vial I can tell approximately what is the strength of the solution represented by the unknown. If it happens that the two neutralized colors are exactly the same then I can get a direct reading and know exactly what the strength of the unknown solution is without further test. If, on the other hand, the color is not exactly the same then, leaving the whole numbered vial in place, I take out the zero and try each of the other fractional vials until I get an exact balance in color. It may also happen that the use of the fractional vials makes the discrepancy between the colors greater. In this case I know that the intensity of the solution is somewhat less than the intensity of the unknown, and I will put in place a whole numbered vial of the next smaller denomination and again try all the fractional vials until I get an exact balance in color. Having done this I can get a direct reading, the strength of the solution being the sum of the solution strength of the whole numbered and fractional vials.

As an example, having started with a vial of unknown solution, placed in line with the neutralizer vial, with the zero vial alongside the neutralizer, and having tried the various whole numbered vials so placed as to neutralize the zero vial, I find that the six ounce vial gives almost the same color in the two pairs of vials. Then I substitute for the zero vial each one of the fractional vials until I find that the three-quarter ounce vial gives the same color of neutralized light passing through the two pairs of vials, and by reading the labels on the vials I discover that the unknown contains six and three-quarter ounces per gallon of nickel. If it should happen, however, that the addition of the quarter-ounce vial in line with the six-ounce vial would cause the color to become less similar than before I would substitute the five-ounce vial for the six-ounce and start over again with the fractional vials until I found that the three-quarter ounce vial gave me the same color. Then I would know that the correct reading for the strength of the nickel solution was five and three-quarter ounces.

It is not necessary that the red solution have any particular intensity. It might be very dull red or a very intense one. It does not make any difference just what the absolute color values are because my method takes advantage of a comparison only, and it is only necessary that such relation be used between the various colors as will enable a substantial balancing of appearance in the two pairs of vials. It is not necessary even to use these vials with the solution prepared in them. It is not necessary that the comparison tubes contain nickel solution. They can as above pointed out contain dyes, or glass properly colored can be used. The reason for using nickel solution is that dyes sometimes change color, the nickel solution itself does not. Since the nickel solution is easily measured and easily obtained, it is best to use it, and where I describe it as nickel solution it must be understood that I mean a solution or color screen of that color.

In the above method it will be seen that a certain red color is placed in line with an unknown green color and that the same red color is used with a known green color, however, in the latter case this red color is equally divided between the two test vials. Of course the color seen thru the two pairs of tubes will be the same (when in balance) regardless of whether the red color is all in one tube or divided equally or unequally in two tubes. As explanation, suppose our unknown does contain four and one-half ounces of metallic nickel per gallon, it therefore has a color equivalent to that amount of nickel. In line with it we have the neutralizer tube and by inspection we see a pale green color thru them both. Alongside the neutralizer vial we have the one-half ounce per gallon vial and in line with it (alongside the unknown) we have the four ounce per gallon vial and by inspection we see a pale green color thru them, this color being identically the same as that produced with the unknown and the neutralizer. In the first case we are looking thru a series of two vials containing four and one-half ounces per gallon of nickel and no red in the unknown, and the red of the neutralizer and no nickel in the neutralizer vial. In the second line we are looking thru a series of two vials containing four ounce per gallon nickel and one half of the red of neutralizer plus one half ounce per gallon nickel and one half the red of the neutralizer. In other words, the colors in each line of vials may be divided between the two vials, just so long as the summation of the red in one line is the same as the summation of red in the other line. The same for the green.

From the above it can be seen that a second method for applying my process can be used. A series of vials containing only nickel solution from one-quarter ounce per gallon to six ounce per gallon in one-quarter ounce increments could be used if two neutralizer vials were used, i. e., one in line with the unknown and one in line with the above mentioned vials. This would necessitate a much larger number of tubes and in operation would probably tire the eye, owing to the less striking variations in appearance between successive vials throughout the entire range where the strength changes by quarter ounce increments instead of by one ounce increments.

A fourth method (and one that is suggested to be used in case of weak nickel solutions, and can be used with the vials used in the first method) uses a tube of water. As previously mentioned the neutralizer tube was of such intensity as to almost completely optically neutralize a similar tube of three ounce per gallon nickel. We can assume that at this point the apparatus is most efficient, i. e., the colors can be more easily compared where the color is not very dense. Therefore, if we have a weak nickel solution, say one and one-quarter ounces per gallon as an unknown, we get, when placing the neutralizer vial in line with it, a very red solution, which can be matched with the one and one-quarter ounce per gallon test vials in line. However, this color is very close to the color produced with the one and the zero in line, or with the one and one-half in line. We can now remove the neutralizer tube from in line with the unknown and place in its stead the zero tube. Alongside the unknown we place a tube of water and in line with this water tube we place a whole number ounce per gallon vial, substituting them as in the first method until the colors match or come close to matching, then removing the zero vial and using the fractional vials until an exact match or balance is obtained. When a color match is obtained the vial in line with the unknown is subtracted from the vial in line with the water. We see that here we are looking in each case thru the same amount of red color and incidentally each contained in only one vial. The purpose of subtracting can be easily seen by inspecting the diagram. The purpose of the tube of water is that we see light passing thru similar quantities of solution and glass.

While this explanation has been devoted to the determination of nickel in solution the process is applicable to all other solutions where color is an indication of their strengths. Thus for copper solutions we could use as a neutralizer an orange color, for copper solutions are blue and orange will optically neutralize blue. For the yellow or orange chromium solutions we could use blue as a neutralizer. It is not necessary that we use vials of solution as the standard, we could use colored glasses capable of transmitting the same color as the vials of standard solutions.

My invention is illustrated in the accompanying drawing which shows a perspective view of an apparatus adapted to carry out the invention. A is a box having therein four pockets $A^1$ $A^2$ $A^3$ $A^4$, the pockets being laterally apertured at $A^5$ $A^6$ so that two separate light beams may pass one through each pair of pockets.

B is the vial containing red solution called the neutralizer. $B^1$ the vial containing red solution of half the intensity of the neutralizing color called the zero vial. $B^2$ is one of a series of graduated vials and $B^3$ the vial containing the unknown liquid. A series of the graduated vials are shown mounted in the pockets.

I claim:

1. The process of determining the strength of solutions the intensity of the color of which bears a direct relation to the strength thereof, which consists in comparing the color of light transmitted thru a body of the unknown and a neutralizing color screen with the color of light transmitted thru a similar color screen and a body of material of the same color as the unknown, the intensity of which in terms of strength of the solution is known.

2. The process of colorimetrically determining the strength of an unknown solution, which consists in comparing the apparent color of light rays passing thru the unknown and a body of neutralizing solution with the light rays passing thru a solution of known strength and a similar neutralizing solution, the neutralizing solution being partly mixed with the known and partly separate therefrom.

3. The process of colorimetrically determining the strength of an unknown solution, which consists in comparing the apparent color of light rays passing thru the unknown and a body of neutralizing solution with the light rays passing thru a solution of known strength and a similar neutralizing solution, the neutralizing solution being partly mixed with the known and partly separate therefrom, the total amount separate from the known being equal in strength to half of the neutralizing solution associated with the unknown.

4. The process of determining the strength of color solutions which comprises causing a beam of light to pass successively through a specimen color solution and a standard neutralizing solution; simultaneously causing a second beam of light to pass successively through a standard neutralizing-color solution and a second standard neutralizing solution; and successively substituting for the standard neutralizing-color solution other standard neutralizing-color solutions having different intensities of color until the beams of neutralized light are substantially of the same shade of color.

5. The process of determining the strength of color solutions which comprises causing a beam of light to pass successively through a specimen color solution of known kind but unknown intensity; and a standard neutralizing solution of known intensity; simultaneously causing a second beam of light to pass successively through a standard neutralizing-color solution and a second standard neutralizing solution, the standard neutralizing-color solution comprising a color solution of known intensity, and of the same kind as that of the specimen being considered, mixed with a neutralizing solution of the same kind as that associated with the specimen solution and of substantially one-half the intensity of said first mentioned neutralizing solution, the second mentioned neutralizing solution being also of the same kind as that associated with the specimen solution and of substantially one-half the intensity of said first mentioned neutralizing solution; comparing the beams of neutralized light and successively substituting for the standard neutralizing-color solution other standard neutralizing-color solutions until the beams of neutralized light are substantially the same shade of color, all of said standard neutralizing-color solutions including neutralizing solutions of the same kind and intensity, and color solutions of the same kind but of different intensities.

6. The method recited in claim 4 wherein a further degree of accuracy is obtained by then successively substituting for the second mentioned standard neutralizing solution other standard neutralizing-color solutions differing in color intensity.

Signed at Chicago, county of Cook, and State of Illinois, this 27th day of April, 1926.

CYRIL KOCOUR.